Dec. 31, 1963    R. A. PLANTE    3,115,711
AREA COMPARISON GAGE
Filed April 26, 1961    5 Sheets-Sheet 1

INVENTOR.
ROBERT A. PLANTE
BY Kenway, Jenney & Hildreth
ATTORNEYS

Dec. 31, 1963  R. A. PLANTE  3,115,711
AREA COMPARISON GAGE
Filed April 26, 1961  5 Sheets-Sheet 2
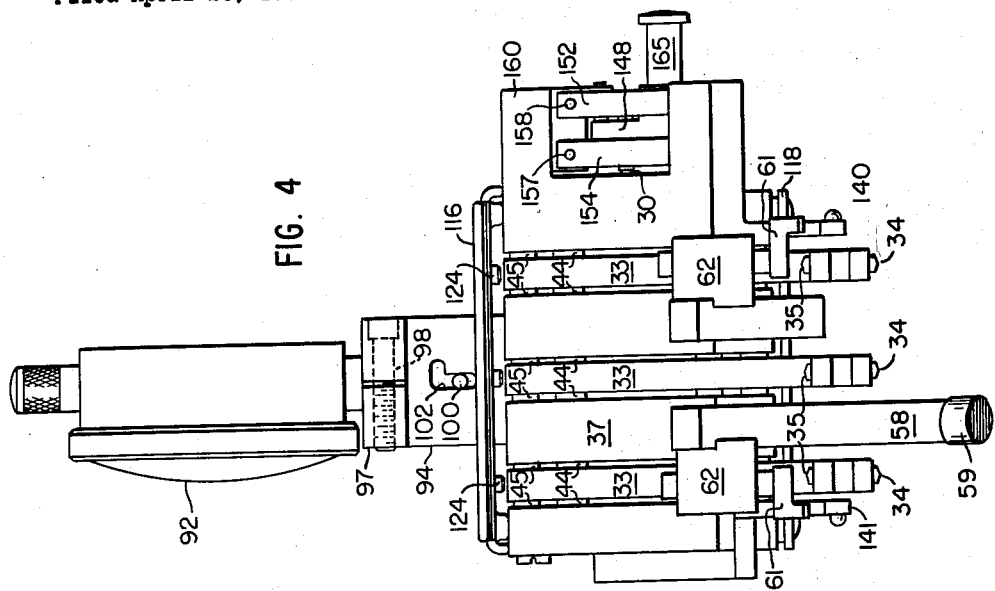
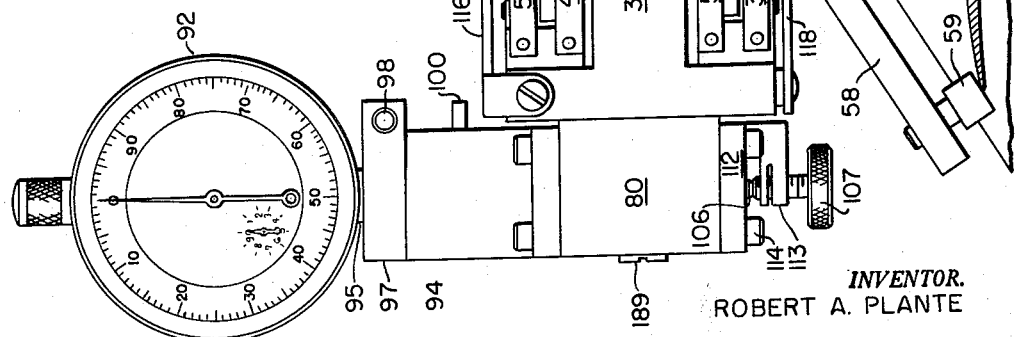
INVENTOR.
ROBERT A. PLANTE
BY Kenway, Jenney & Hildreth
ATTORNEYS Dec. 31, 1963   R. A. PLANTE   3,115,711
AREA COMPARISON GAGE
Filed April 26, 1961   5 Sheets-Sheet 3

INVENTOR.
ROBERT A. PLANTE
BY Kenway, Jenney & Hildreth
ATTORNEYS

INVENTOR.
ROBERT A. PLANTE
BY Kenway, Jenney & Hildreth
ATTORNEYS

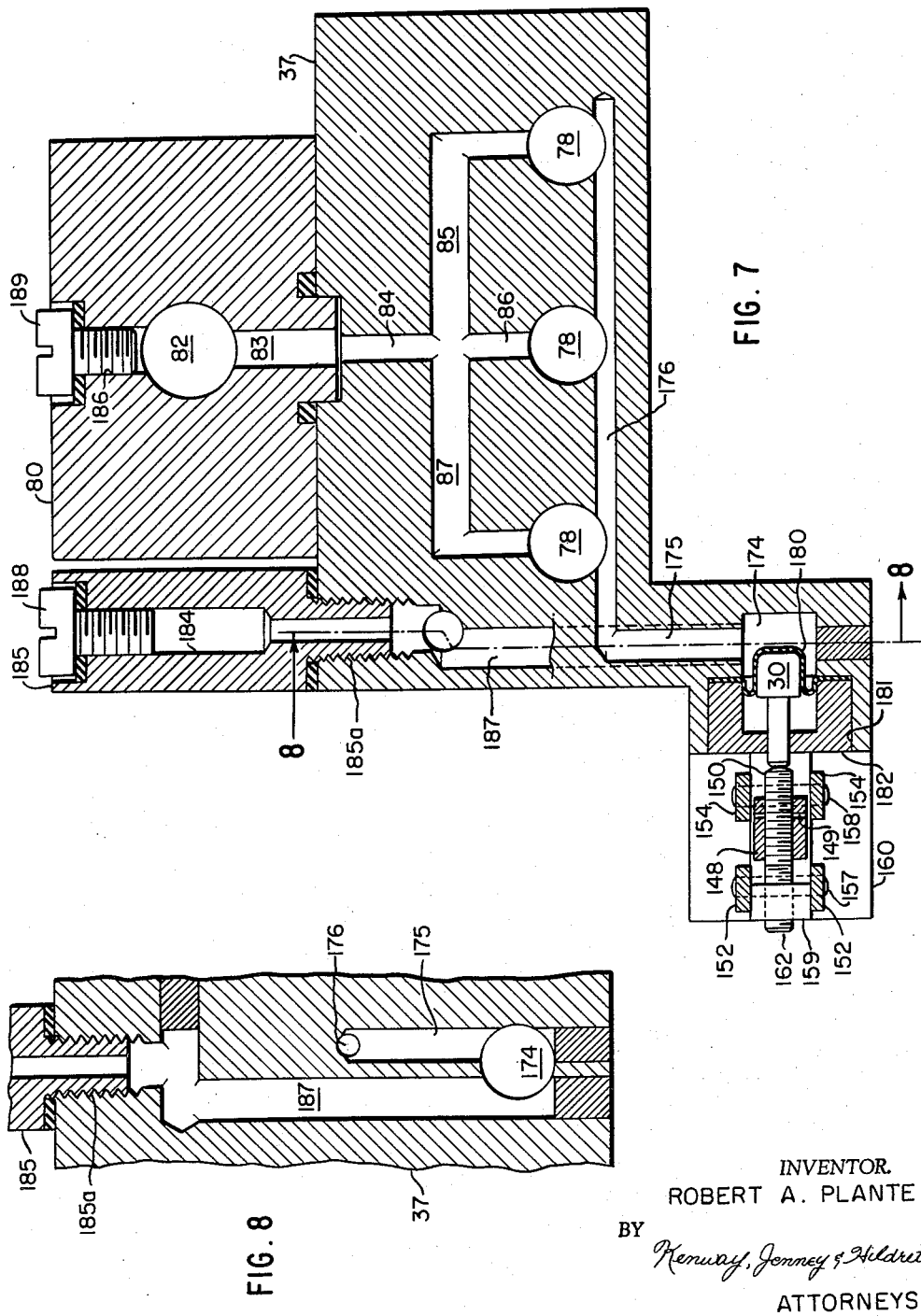

United States Patent Office 3,115,711
Patented Dec. 31, 1963

3,115,711
AREA COMPARISON GAGE
Robert A. Plante, Erving, Mass., assignor to The L. S. Starrett Company, Athol, Mass., a corporation of Massachusetts
Filed Apr. 26, 1961, Ser. No. 105,593
10 Claims. (Cl. 33—174)

This invention relates to an improved gage for comparing the areas of passages, openings, or recesses in articles with specified nominal values. It is the primary object of the invention to provide an improved area comparison gage which directly and accurately measures the deviation of an enclosed area from a specified nominal value, such that any requirement for calculation of the area on the basis of linear measurements is dispensed with. It is a further object of the invention to provide an improved gage for comparing irregular as well as regular areas with specified nominal values. Additional objects and features of the invention will become apparent as the following description proceeds.

In the manufacture of articles having openings or passages, it is often desired to accurately measure the deviation in cross-sectional area of such openings from specified nominal values, without specific reference to the actual transverse dimensions of the passage. Previously available gages have achieved accurate results only through measurement of transverse dimensions of the area, necessitating a computation of the area through a separately performed calculation. The computation is particularly complex where an irregular passage is to be measured.

The present invention is based upon an improved hydraulic measuring system which afford a linear output signal accurately approximating the deviation from a pre-selected nominal value of the area of an irregularly-shaped passage, by algebraically summing the fluid displacements of at least two sensor pistons which are movable in response to the deviations of transverse linear dimensions of the measured area from nominal values. I have found that if the cross-sectional areas of the pistons are proportioned according to a specific relationship, this hydraulic addition of the deviations in linear dimensions provides an output signal which is proportional to the deviation in cross-sectional area of the passage.

In the measurement of irregular or non-symmetrical areas, a plurality of additional sensor pistons are arranged to engage the boundaries of the area along axes which may be transverse to one or both of the transverse axes of the basic system. This system in effect sums the transverse dimensions of a series of rectangles or other regular geometric figures whose total area may approximate the irregular area of the passage with considerable accuracy, and is an application of a well-known principle of calculus.

According to a further feature of my invention, the basic measuring system may be combined with a plurality of movable fingers contacting the boundaries of the area and transmitting their linear displacements to the sensor pistons. I prefer to mount the fingers upon parellelogram linkages for linear movement, to displace the sensor pistons in accurate linear response to deviations in the lateral dimensions of the area. This system facilitates the measurement of relatively small areas, into which the hydraulic system itself could not be inserted.

While the specification concludes with claims particularly pointing out and distinctly claiming the subject matter which I regard as my invention, it is believed that the invention, together with certain additional features thereof, will be more clearly understood from the following detailed description of preferred embodiments thereof, referring to the accompanying drawings, in which:

FIG. 3 is a side elevation of another embodiment of the invention particularly adapted for measuring flow areas between partitions of a turbine nozzle diaphragm;

FIG. 4 is a rear elevation of the gage of FIG. 3;

FIG. 7 is a sectional view taken along line 7—7 in FIG. 6, looking in the direction of the arrows; and FIG. 8 is a sectional view taken along line 8—8 in FIG. 7, looking in the direction of the arrows.

Figure 1:
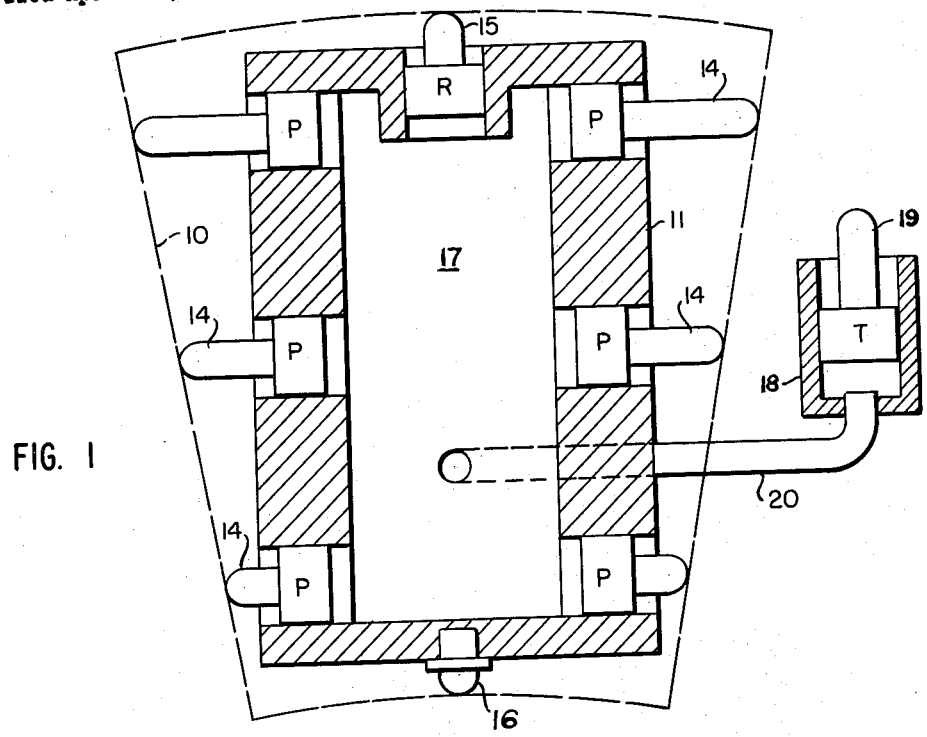
FIG. 1 is a schematic view of a simplified gage incorporating the measuring system of the invention.
Figure 2:
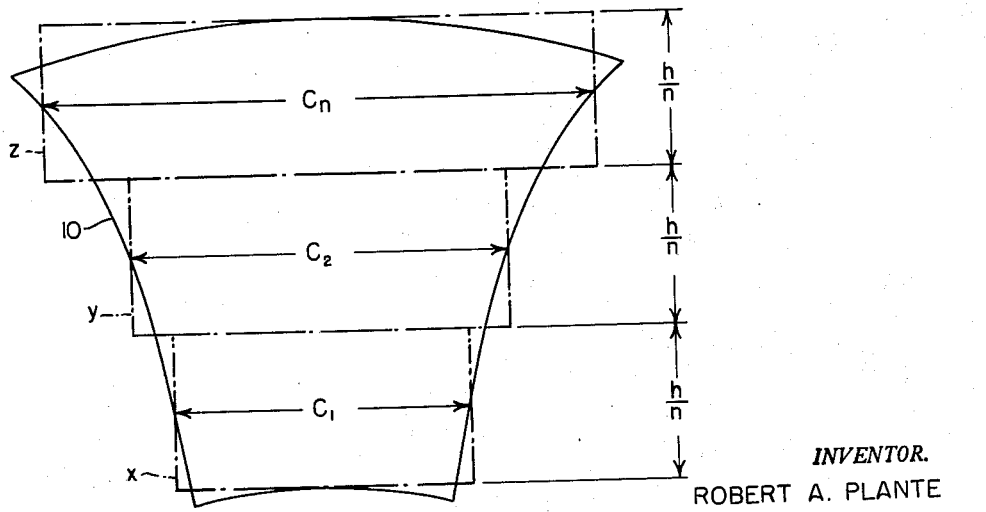
FIG. 2 is a schematic diagram of a representative irregular area, illustrating the measurements from which the gage derives a cross-sectional area.
Figure 5:
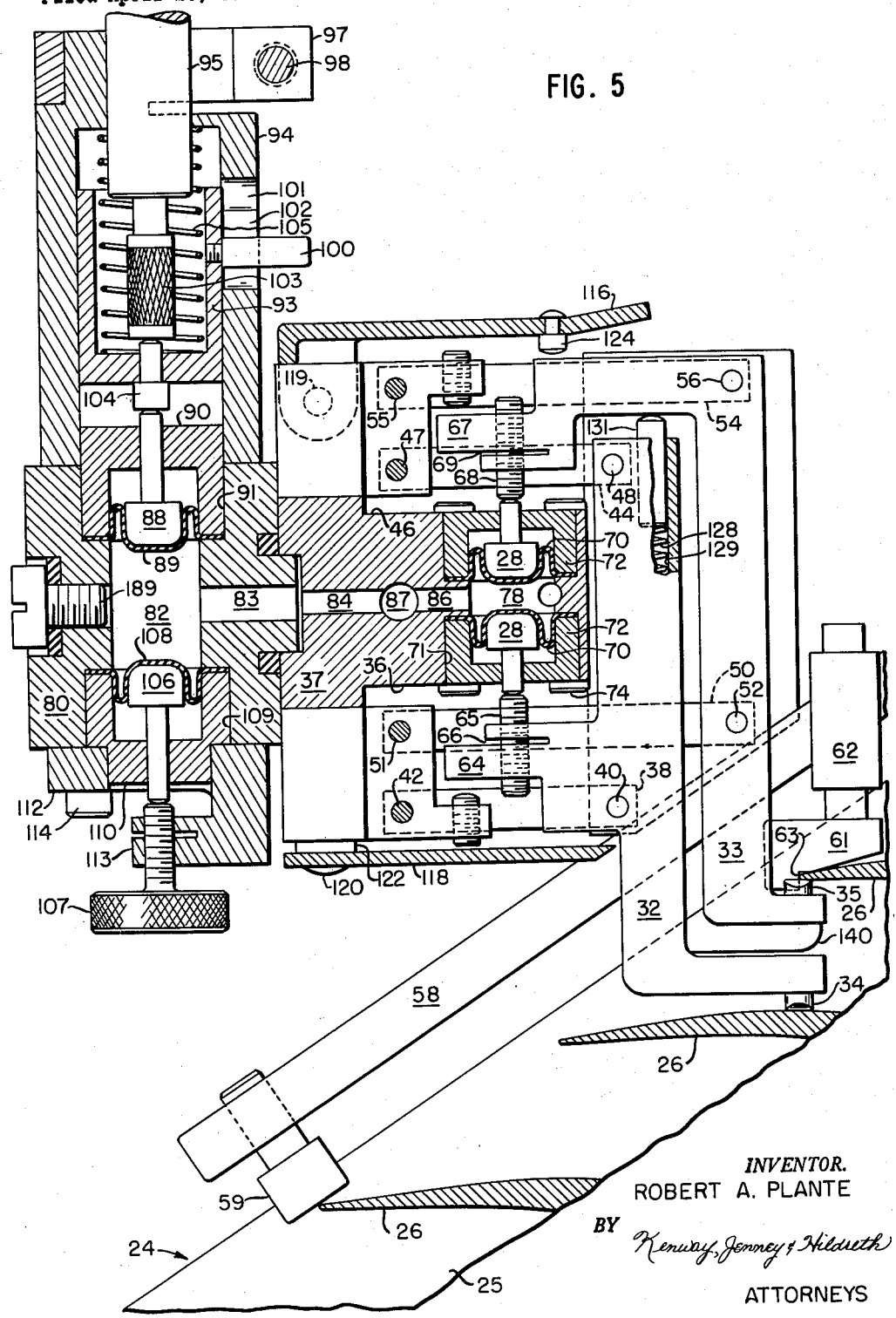
FIG. 5 is a view in cross-section.

Referring to FIGS. 1 and 2, the improved gage utilizes a principle of approximation to measure the area of a passage 10 of irregular form. The area is approximated by summing the areas of a series of imaginary rectangles shown in dotted lines at X, Y, and Z, which are of equal height in this example, and may be of any number affording a desired degree of accuracy. Each rectangle has dimensions along normal axes of $h/n$ and $C_1, C_2, \ldots C_n$. The area of the passage 10 is then equal to $$\frac{h}{n}\sum_0^n C$$

According to the invention, I utilize this method of approximation by providing a closed hydraulic system including a chamber-forming housing 11 in which are slidably mounted a plurality of sensor pistons P, having contacts 14 arranged to engage opposed longitudinally extending boundaries of the area 10 for displacement of the pistons along axes transverse to those boundaries. In the system shown, three sets of pistons P are provided, corresponding to the lateral dimensions $C_1, C_2, C_n$ in FIG. 2. For the measurement of the dimension $h$, a single sensor piston R is provided with a contact 15 for movement by its engagement with one of the laterally extending boundaries of the area. A fixed contact 16 is press-fitted into the body of the housing 11, to afford a fixed reference point for positioning the gage in the passage 10. Any practical number of pistons R may be provided as required to secure a desired degree of accuracy; in the example shown, however, it is assumed that the laterally extending boundaries of the area are sufficiently planar to secure a desired degree of accuracy with a single measurement. Each of the pistons P and R communicate with a closed hydraulic fluid input chamber 17 formed in the housing 11, for algebraic summation of their linear movements by the displacement of fluid therein.

An output piston T is mounted in an output chamber 18, and is provided with a contact 19. A conduit 20 connects the piston T in fluid-flow communication with the chamber 17, for displacement of the contact 19 as a function of the algebraic sum of the fluid displacements of the sensor pistons P and R. I have found that if the areas of the pistons P and R bear a certain proportion, which is dependent upon the relationship between the nominal dimensions of a specific area 10 to be measured, the displacement of the contact 19 is proportional to the deviation of the area 10 from the specified nominal value. In practice, the contact 19 is drivingly connected with a linear-displacement indicator of any desired mechanical or electrical type, so that a direct reading of the deviation in passage area of sample articles may be directly measured.

The ratio of the cross-sectional areas of each of the pistons R to that of each piston P must be equal to the ratio of the sum of the measured lateral dimensions C to the sum of the measured longitudinal dimensions $h$, to achieve the desired proportionality of the output signal to the deviation in cross-sectional area. In the case illustrated, a single longitudinal dimension is measured, so that the required condition may be stated as follows:

$$\frac{r_R^2}{r_P^2} = \frac{\sum_0^n C}{h}$$

where $r_R$ represents the radius of a piston R and $r_P$ represents the radius of a piston P. This relationship may be derived as follows: referring to the diagram of FIG. 2, the total derivitive of the area A may be expressed as:

$$dV = \pi r_P^2 \left[ \frac{r_R^2}{r_P^2} dh + \sum_0^n dC \right]$$

The total derivitive of the fluid displacement V may be written as:

$$dV = \pi r_P^2 \left[ \frac{r_R^2}{r_P^2} dh + \sum_0^n dC \right]$$

If the condition is established that:

$$\frac{r_R^2}{r_P^2} = \frac{\sum_0^n C}{h}$$

Then the relationship between the deviation in displacement and the deviation in measured area is a constant:

$$\frac{dV}{dA} = \frac{\pi r_P^2}{h/n}$$

That is, the deviation in area is proportional to the volume of fluid displaced in the system, and is expressed as the linear displacement of the output piston T. This result is not dependent upon there being a particular number of sensor pistons for the measurement of either transverse dimension, provided only that the previously-stated relationship between the cross-sectional areas of the individual pistons of the two groups is established. Furthermore, the system is applicable to the measurement of both regular and irregular areas of all forms, although a greater number of sensor pistons may be necessary to obtain satisfactorily accurate measurement of highly irregular areas.

In many applications, it is not practical to provide a system of the type shown in FIG. 1 with boundary-engaging contacts directly affixed to the sensor pistons, since the area to be measured is not large enough to receive such a system. One such application in which the invention has particular utility is the measurement of the flow areas between the adjacent partitions of a turbine nozzle diaphragm. Referring now to FIGS. 3–8, an embodiment of the invention is shown which incorporates additional features adapting the improved system to the measurement of such a flow area. In FIG. 3, an illustrative turbine nozzle diaphragm generally designated 24 includes an outer annular band 25, a concentric annular internal band (not shown), and a plurality of radial partitions 26 circumferentially spaced about the bands and extending radially therebetween. It is desired to measure the flow area between adjacent partitions upon a plane generally designated P.

A plurality of sensor pistons 28 are provided for measuring the chordal dimensions of the flow area at three stations radially spaced along the spans of the partitions, and a single sensor piston 30 is provided for measuring the radial height dimension between the inner and outer bands of the diaphragm. However, according to a further feature of the invention, the sensor pistons do not directly contact the boundaries of the nozzle area, but are arranged to be displaced in response to the movements of a plurality of fingers adapted to that purpose. The fingers are mounted upon parallelogram linkages for linear movement, to accurately transfer the measured deviations to the sensor pistons with linear response. Each pair of pistons 28 is provided with a pair of fingers 32 and 33, which carry contacts 34 and 35, respectively, for engaging the adjacent partitions along a chordal line lying in the plane P. Each finger 32 is mounted within a slot 36 formed in a housing member 37, and is pivoted at 40 to a first pair of links 38, which are pivoted at 42 in the slot. A second pair of links 44, equal in length to the links 38, are similarly pivoted to each finger 32 at 48, and are pivoted at 47 in a corresponding slot 46 in the housing. In a similar manner, each finger 33 is mounted for linear movement by means of a pair of links 50 pivoted at 51 in the slot 36, and at 52 to the finger. Second pairs of links 54 of equal length are each pivoted at 55 in a corresponding slot 46, and at 56 to a corresponding finger 33. By means of these parallelogram linkages, the fingers 32 and 33 are arranged for parallel substantially linear movement in response to the displacement of the contacts 34 and 35 by their engagement with the boundaries of the nozzle passage.

The gage is positioned at a desired angle with respect to the nozzle diaphragm, for engagement of the contacts with the partitions on the plane P, by means of an arm 58 affixed to the housing member 37 by any suitable means, and bearing a foot 59 for engagement with the trailing edge of an adjacent partition. A second foot 61 is fixed on the arm 58 by a block 62 secured thereto by any suitable means (not shown), and bears upon the suction surface of a partition 26 opposite to the pressure surface engaged by the contact 35. As shown, the foot 61 is formed with a notch 63 to engage the trailing edge of the partition for positively positioning the gage.

Each of the fingers 32 is formed with a lug 64 receiving a stud 65 in threaded engagement therewith along the axis of the corresponding piston 28, and is split at 66 for locking engagement of the stud in an adjusted position therein. Similarly, each of the fingers 33 is formed with a lug 67 receiving a stud 68 in threaded engagement therewith to extend along the axis of the corresponding piston 28, the lug being split at 69 for locking engagement with the stud.

The pistons 28 are mounted in flexible diaphragms 70, which are received in recess 71 formed in the housing member 37, and secured about peripheral portions thereof by means of mating inserts 72 fastened in the recesses by machine screws 74. The diaphragms 70 are of a well-known type adapted to produce a fluid displacement, in a series of input chambers 78 formed within the housing member, proportional to the linear displacement of the pistons by the fingers 32 and 33. A second housing member 80 forms an output fluid chamber 82 which communicates with the input chambers 78 through a passage 83 formed in the housing member 80, and a passage 84 and branch passages 85, 86, and 87 formed in the housing member 37 (FIG. 7). The housing members are secured in fluid-tight relationship by a plurality of machine screws 84, shown in FIG. 6.

The displacement of the sensor pistons 28 is transmitted by hydraulic fluid enclosed in the housing to an output piston 88 received in the chamber 82, and mounted in a flexible diaphragm 89 whose periphery is secured by means of an insert 90 in a matting recess 91 formed in the housing member 80. In the embodiment shown, the displacement of the output piston 88 is transmitted to a linear displacement indicator 92 of any suitable type, by means of a spring retainer 93 slidably received in a further housing member 94. A neck portion 95 of the indicator is secured in the housing member by means of a split collar 97 formed therein, and is secured by a clamping screw 98. When the gage is not in use, the spring retainer 93 may be locked in a position disengaged from the piston 88 by means of a stud 100 threaded in the retainer, by manually sliding the stud into the transverse leg 101 of an L-shaped slot 102 formed in the housing member; this disengagement prevents a permanent "set" from being imparted to the diaphragm 89. The stud is shown positioned in the longitudinally-extending portion of the slot 102 to permit movement of an actuating spindle 103 of the indicator by the piston 88, through a hardened anvil 104 press-fitted into the retainer 93. A compression spring 105 is interposed between the housing and the retainer to preload the hydraulic system in compression for improved accuracy of initial response.

A calibrating piston 106 is positioned in the chamber 82 for adjustment by a calibrating screw 107, so that the indicator may be zeroed by placing the gage upon a master block set to the nominal longitudinal (radial height) and lateral (chordal) dimensions of the nozzle passage area to be measured. The calibrating piston is provided with a flexible diaphragm 108, which is peripherally sealed in a recess 109 of the housing member 80 by an insert 110. A ring member 112 bears a split lug 113 into which the calibrating screw is threaded, and this member is secured on the housing by a plurality of machine screws 114.

To permit the contacts 34 and 35 to be inserted without interference between the nozzle partitions, a retractor 116 is pivotally mounted upon the housing member 37 by means of a pivotal connection 119. At its free end, the retractor is provided with a plurality of riveted studs 124 for engagement with corresponding ones of the fingers 33, for manual withdrawal of the contacts 35 toward the contacts 34. A rigid cover plate 118 is mounted by means of screws 120 and spacing washers 122 upon the housing opposite to the retractor, to permit the user to hold the gage without gripping the finger mechanism.

For biasing the contacts into engagement with the partitions upon release of the retractor, the compressional preload applied to the hydraulic system is aided by a plurality of compression springs 128, each received within a bore 129 formed in a corresponding finger 32. Each of the springs urges a stud 131 into engagement with a corresponding one of the fingers 33 to bias the fingers 32 and 33 oppositely. Thus, the fingers may be inserted between the nozzle partitions by manually depressing the retractor 116; upon the release of the retractor, the contacts resiliently engage the partitions.

Figure 6:
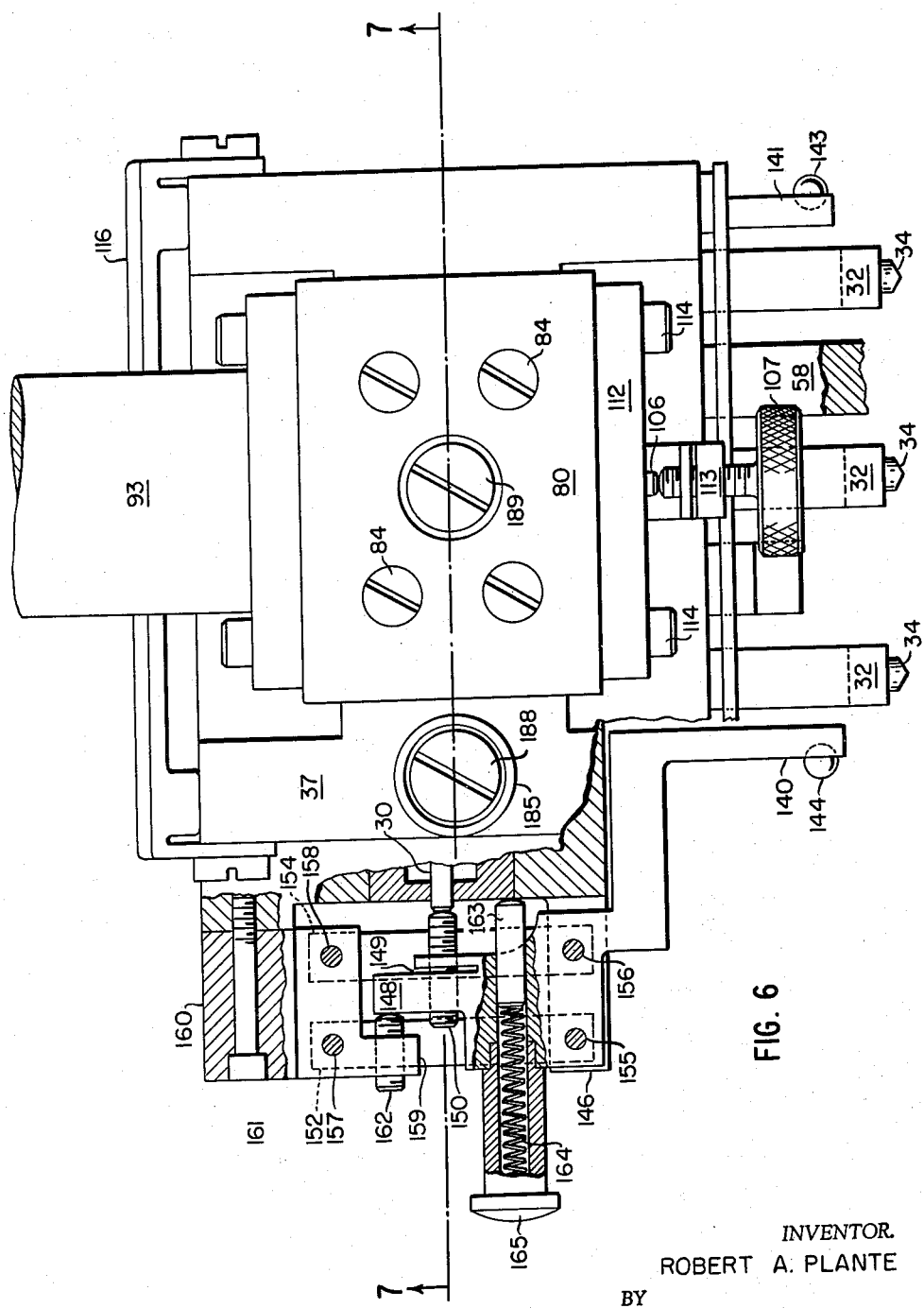
FIG. 6 is a fragmentary view in front elevation.

For the measurement of the radial height dimension of the nozzle passage, I provide a single pair of fingers 140 and 141, as best shown in FIG. 6. The finger 141 bears a contact 143 and is fixed to the housing in the embodiment shown, to provide a reference location for the gage; the deviation in the radial height dimension from the nominal value is measured by the sensor piston 30 in response to the movement of a contact 144 mounted on the movable finger 140. The movable finger extends between a pair of upstanding parallel lugs 146 formed in the housing member 37, and is formed with a lug 148 split at 149, in which is threaded a stud 150 for engaging the end of the piston. Two pairs of links 152 and 154 form a parallelogram linkage pivotally supporting the finger in the housing for substantially linear movement, affording a linear response of the piston to movement of the contact 144. The links are pivoted to the finger at 155 and 156, respectively, and at 157 and 158 to a lug 159 which extends from an upstanding member 160, secured to the housing by screws 161. The contact is thus arranged to drive the piston 30 to transmit the deviation in the radial height dimension thereto. A stud 162 is threaded through the lug 159 to limit the movement of the finger 140 outwardly with respect to the housing. A stud 163 is slidably received in the finger, and is biased against the housing by a compression spring 164 received in a retractor button 165, to urge the finger outwardly of the gage. The retractor button is press-fitted into the finger for manual depression of the contact 144, to facilitate its insertion into a turbine nozzle passage.

As best shown in FIG. 7, the radial height piston 30 communicates with the input chambers 78 and thence with the output chamber 82 through a further input chamber 174, a passage 175, and a branch passage 176, all formed in the housing member 37. The piston 30 is provided with a flexible diaphragm 180, which is peripherally seated in a recess 181 and retained therein by means of an insert 182.

For filling the enclosed chambers of the gage with a suitable hydraulic fluid, a port 184 is formed in a housing member 185, communicating with the passage 175 through the chamber 174 and a passage 187. The member 185 is threaded into the housing at 185a. An air release port 186 is formed in the housing member 80 in communication with the chamber 82, for escape of any entrapped air from the system during filling. Extending the passage 187 to the chamber 174, rather than joining it directly to the passage 175, insures that no air will be entrapped in the lower part of the system. When not in use, the ports 184 and 185 are sealed by screws 188 and 189, respectively, threadedly engaged therein.

It will be seen that the gage forms an enclosed hydraulic chamber in which the output piston is displaced in proportion to the algebraic sum of the fluid displacements of the chordal and radial height sensor pistons, which are responsive to the deviations of the corresponding measured dimensions from their nominal values.

In the use of the gage for the measurement of flow areas, the gage is first calibrated to the nominal value; the contacts of the various sensor pistons are engaged upon a master gage block incorporating the nominal area, and the indicator is adjusted to a zero reading. The fingers are then inserted into the passage which it is desired to measure. The deviation in area is registered directly on the indicator, provided that the calibrations of the indicator dial are arranged for this purpose. However, since the deviation in area is directly proportional to the linear displacement registered by the gage, a standard dial indicator calibrated for linear measurement may be used, together with a table correlating the registered linear displacements with deviations in area.

It will be understood from the previous description of the embodiment of FIG. 1 that the ratio of the cross-sectional area of each sensor piston 28 to that of the piston 30 is to be equal to the ratio existing between the nominal radial height and the sum of the nominal chordal dimensions to be measured. In the embodiment shown, a single piston is employed for measurement of the radial height, while a pair of pistons is used for the measurement of each chordal dimension. This arrangement facilitates the use of a fixed contact to establish a reference location of the gage within the boundaries of the area being measured. However, it will be apparent that a pair of movable pistons may be used to measure each dimension along either of the sets of transverse axes, in lieu of using one movable piston and one fixed contact for any one of the measurements. The areas of each of the sensor pistons should be selected according to the relationship previously stated, whichever arrangement is used; that is, the area of the individual pistons is the same in either case. Separate means for establishing a reference location of the gage with respect to the area to be measured may be utilized if desired.

It will be apparent to those skilled in the art that various additional changes and modifications may be made without departing from the true spirit and scope of the invention. The improved gage may be readily modified for the measurement of various regular or irregular areas, including those having polyhedral and circular cross-sections. The number of series of sensor pistons selected to measure the transverse dimensions along parallel sets of transverse axes may be arbitrarily chosen, depending upon the degrees of irregularity of the passage to be measured and the desired degree of accuracy in the approximation of the true area by the rectangular method. It is only necessary that the ratio of the effective cross-sectional area of each piston used to measure the dimensional deviations along a first set of parallel axes, to that of each piston used to measure the dimensional deviations along the transverse set of parallel axes, be substantially equal to the inverse ratio of the sums of the nominal dimensions corresponding thereto.

What I desire to claim and secure by Letters Patent of the United States is:

1. A gage for directly measuring the deviation in cross-sectional area of a passage from a nominal value, comprising, in combination; means forming an enclosed hydraulic fluid chamber, at least a first and a second sensor piston slidably received in said chamber to displace fluid therein according to the algebraic sum of their individual fluid displacements, said sensor pistons arranged on intersecting axes disposed in the plane in which the cross-sectional area of the passage is to be measured, for linear displacement in response to the deviations from nominal values of first and second dimensions of said passage along said intersecting axes, respectively, the ratio of the cross-sectional areas of said first to said second sensor pistons being at least approximately equal to the inverse ratio of the corresponding nominal dimensions of said passage along said intersecting axes, and an output piston in fluid-flow communication with said chamber for linear displacement in proportion to the displacement of fluid by said sensor pistons.

2. A gage as recited in claim 1, together with means supported in fixed relation upon said chamber-forming means for establishing a reference location of said chamber-forming means with respect to a passage whose area is to be measured by the gage.

3. A gage for directly measuring the deviation in cross-sectional area of a passage from a nominal value, comprising, in combination; means forming an enclosed hydraulic fluid chamber, at least a first and a second sensor piston slidably received in said chamber to displace fluid therein according to the algebraic sum of their individual fluid displacements, said sensor pistons arranged on intersecting axes disposed in the plane in which the cross-sectional area of the passage is to be measured, to interiorly engage boundaries of the passage for linear displacement along said intersecting axes in response to the deviations from nominal values of first and second dimensions of said passage, respectively, the ratio of the cross-sectional areas of said first to said second sensor pistons being at least approximately equal to the inverse ratio of the corresponding nominal dimensions of said passage, and an output piston in fluid-flow communication with said chamber for linear displacement in proportion to the displacement of fluid by said sensor pistons.

4. A gage for directly measuring the deviation in cross-sectional area of a passage from a nominal value, comprising, in combination; means forming an enclosed hydraulic fluid chamber, at least a first and a second sensor piston slidably received in said chamber to displace fluid therein according to the algebraic sum of their individual fluid displacements, a plurality of finger means arranged to interiorly engage boundaries of the passage for linear displacement along intersecting axes disposed in the plane in which the cross-sectional area of the passage is to be measured, in response to the deviations from nominal values of corresponding dimensions of said passage, respectively, each of said finger means drivingly engaged with a corresponding one of said sensor pistons, respectively, the ratio of the cross-sectional areas of said first to said second sensor pistons being at least approximately equal to the inverse ratio of the corresponding nominal dimensions of said passage along said intersecting axes, and an output piston in fluid-flow communication with said chamber for linear displacement in proportion to the displacement of fluid by said sensor pistons.

5. A gage as recited in claim 4, together with further finger means supported in fixed relation upon said chamber-forming means to interiorly engage a boundary of the passage for establishing a reference location of said chamber-forming means.

6. A gage for directly measuring the deviation in cross-sectional area of a passage from a nominal value, comprising, in combination: means forming an enclosed hydraulic fluid chamber, at least one sensor piston arranged for linear displacement in response to the deviation from a nominal value of a first cross-sectional dimension of said passage along a first axis, a plurality of further sensor pistons respectively arranged for linear displacement in response to the deviations from nominal values of further cross-sectional dimensions of said passage along parallel spaced-apart axes perpendicular to said first axis, said sensor pistons slidably received in said chamber to displace fluid therein in proportion to the algebraic sum of their individual fluid displacements, the ratio of the cross-sectional area of said one piston to that of each of said further pistons being at least approximately equal to the ratio of the sum of said further nominal dimensions to said first nominal dimension.

7. A gage for directly measuring the deviation in cross-sectional area of a passage from a nominal value, comprising, in combination: means forming an enclosed hydraulic fluid chamber, a plurality of first sensor pistons respectively arranged for linear displacement in response to the deviations from nominal values of first cross-sectional dimensions of said passage along parallel spaced-apart first axes, a plurality of further sensor pistons respectively arranged for linear displacement in response to the deviations from nominal values of further cross-sectional dimensions of said passage along parallel spaced-apart axes perpendicular to said first axes, said sensor pistons slidably received in said chamber to displace fluid therein in proportion to the algebraic sum of their individual fluid displacements, the ratio of the cross-sectional areas of each of said first pistons to that of each of said further pistons being at least approximately equal to the ratio of the sum of said further nominal dimensions to the sum of said first nominal dimensions.

8. A gage for directly measuring the deviation in cross-sectional area of a passage from a nominal value, comprising, in combination: means forming an enclosed hydraulic fluid chamber, a plurality of sensor pistons slidably received in said chamber to displace fluid therein in proportion to the algebraic sum of their individual fluid displacements, a plurality of finger means, parallelogram linkage means pivotally supporting first and second groups of at least one each of said finger means upon said chamber-forming means in driving relation to first and second groups of at least one each of said sensor pistons, respectively, said first and second groups of finger means arranged to interiorly engage boundaries of the passage for substantially linear displacement thereby along perpendicular first and second groups of parallel axes, respectively, the ratio of cross-sectional areas between the individual sensor pistons of said first and said second groups being substantially equal to the ratio between the sums of the nominal dimensions of said passage along said second and said first groups of axes, and an output piston in fluid-flow communication with said chamber for linear displacement in proportion to the displacement of fluid by said sensor pistons.

9. A gage for directly measuring the deviation in cross-sectional area of a passage from a nominal value, comprising, in combination: means forming an enclosed hydraulic fluid chamber, at least a first sensor piston, first finger means movably supported on said chamber means to interiorly engage boundaries of the passage for linear displacement thereby in response to the deviation from a nominal value of a first dimension of said passage along a first axis, said first finger means drivingly engaged with said first sensor piston, a plurality of further sensor pistons, a plurality of further finger means movably supported on said chamber means to interiorly engage boundaries of the passage for linear displacement thereby in response to the deviations from nominal values of further dimensions of said passage along parallel spaced-apart axes perpendicular to said first axis, each of said further finger means drivingly engaged with a corresponding one of said further sensor pistons, said sensor pistons slidably received in said chamber to displace fluid therein in proportion to the algebraic sum of their linear displacements, the ratio of the cross-sectional area of said first piston to that of each of said further pistons being substantially equal to the ratio of the sums of said further nominal dimensions to said first nominal dimension.

10. A gage as recited in claim 9, together with a plurality of parallelogram linkage means each pivotally supporting a corresponding one of said finger means in driving engagement with a corresponding one of said sensor pistons, for substantially linear movement of said finger means.

References Cited in the file of this patent

UNITED STATES PATENTS

| | | |
|---|---|---|
| 2,028,503 | Doherty | Jan. 21, 1936 |
| 2,909,842 | Aller | Oct. 27, 1959 |

FOREIGN PATENTS

| | | |
|---|---|---|
| 255,455 | Germany | Jan. 9, 1913 |

UNITED STATES PATENT OFFICE
CERTIFICATE OF CORRECTION

Patent No. 3,115,711                                                    December 31, 1963

Robert A. Plante

It is hereby certified that error appears in the above numbered patent requiring correction and that the said Letters Patent should read as corrected below.

Column 1, line 33, for "afford" read -- affords --; column 3, lines 11 to 14, the equation should appear as shown below instead of as in the patent:

$$dA = \frac{h}{n}\left[\frac{\sum_{o}^{n} C}{h} dh + \sum_{o}^{n} dC\right]$$

column 3, line 66, for "he" read -- the --; column 4, line 58, for "matting" read -- mating --.

Signed and sealed this 2nd day of June 1964.

(SEAL)
Attest:

ERNEST W. SWIDER                                        EDWARD J. BRENNER
Attesting Officer                                      Commissioner of Patents